(12) United States Patent
Jin et al.

(10) Patent No.: US 12,367,881 B2
(45) Date of Patent: Jul. 22, 2025

(54) VISUAL SPEECH RECOGNITION BASED ON CONNECTIONIST TEMPORAL CLASSIFICATION LOSS

(71) Applicant: SONY GROUP CORPORATION, Tokyo (JP)

(72) Inventors: Shiwei Jin, San Diego, CA (US); Jong Hwa Lee, San Diego, CA (US); Matthew Wnuk, San Diego, CA (US); Francisco Costela, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 198 days.

(21) Appl. No.: 17/689,270

(22) Filed: Mar. 8, 2022

(65) Prior Publication Data

US 2023/0106951 A1 Apr. 6, 2023

Related U.S. Application Data

(60) Provisional application No. 63/262,049, filed on Oct. 4, 2021.

(51) Int. Cl.
*G10L 15/25* (2013.01)
*G06V 10/82* (2022.01)
(Continued)

(52) U.S. Cl.
CPC .............. *G10L 15/25* (2013.01); *G06V 10/82* (2022.01); *G06V 20/41* (2022.01); *G06V 20/49* (2022.01); *G06V 40/20* (2022.01); *G10L 25/30* (2013.01)

(58) Field of Classification Search
CPC ......... G10L 15/25; G10L 25/30; G10L 15/16; G06V 10/82; G06V 20/41; G06V 20/49; G06V 40/20; G06V 40/16
See application file for complete search history.

(56) References Cited

U.S. PATENT DOCUMENTS 9,269,012 B2 * 2/2016 Fotland ................ G06V 40/103
10,672,383 B1 * 6/2020 Thomson ............... G06N 20/00
(Continued)

FOREIGN PATENT DOCUMENTS

| JP | H09293328 A | 11/1997 |
| JP | 2015028691 A | 2/2015 |
| JP | 2020095732 A | 6/2020 |

OTHER PUBLICATIONS

Jha, et al., "Word Spotting in Silent Lip Videos", Winter Conference on Applications of Computer Vision (WACV), IEEE, Mar. 12-15, 2018, 10 pages.
(Continued)

*Primary Examiner* — Michael N Opsasnick
(74) *Attorney, Agent, or Firm* — CHIP LAW GROUP

(57) ABSTRACT

An electronic apparatus and method for visual speech recognition based on connectionist temporal classification (CTC) loss is disclosed. The electronic apparatus receives a video that includes human speakers and generates a prediction corresponding to lip movements of the human speakers. The prediction is generated based on application of a Deep Neural Network (DNN) on the video and the DNN is trained using a CTC loss function. The electronic apparatus detects, based on the prediction, word boundaries in a sequence of characters that correspond to the lip movements and divides the video into a sequence of video clips based on the detection. Each video clip corresponds to a word spoken by the human speakers. The electronic apparatus generates a sequence of word predictions by processing the sequence of video clips and generates a sentence, or a phrase based on the generated sequence of word predictions.

16 Claims, 4 Drawing Sheets

(51) Int. Cl.
  *G06V 20/40*   (2022.01)
  *G06V 40/20*   (2022.01)
  *G10L 25/30*   (2013.01)

(56) References Cited

U.S. PATENT DOCUMENTS

| | | | |
|---|---|---|---|
| 2003/0018475 A1* | 1/2003 | Basu | G06V 40/161 |
| | | | 704/E11.003 |
| 2010/0332229 A1* | 12/2010 | Aoyama | G09B 19/04 |
| | | | 704/251 |
| 2015/0234862 A1* | 8/2015 | Patil | G06F 16/951 |
| | | | 707/706 |
| 2018/0239955 A1* | 8/2018 | Rodriguez | G06V 40/171 |
| 2019/0285881 A1* | 9/2019 | Ilic | G06T 19/006 |
| 2020/0243094 A1* | 7/2020 | Thomson | G10L 15/28 |
| 2021/0065712 A1 | 3/2021 | Holm | |
| 2021/0090314 A1* | 3/2021 | Hussen Abdelaziz | G06N 3/08 |
| 2021/0110831 A1 | 4/2021 | Shillingford et al. | |
| 2021/0183391 A1* | 6/2021 | Lin | G06T 7/50 |
| 2021/0327431 A1* | 10/2021 | Stewart | G06V 40/45 |
| 2021/0390945 A1* | 12/2021 | Zhang | G10L 13/08 |

OTHER PUBLICATIONS

Triantafyllos Afouras, et al., "ASR is All You Need: Cross-Modal Distillation for Lip Reading", 2020 IEEE International Conference on Acoustics, Speech and Signal Processing (ICASSP), 2020,05, pp. 2143-2147.

* cited by examiner

VISUAL SPEECH RECOGNITION BASED ON CONNECTIONIST TEMPORAL CLASSIFICATION LOSS

CROSS-REFERENCE TO RELATED APPLICATIONS/INCORPORATION BY REFERENCE

This application claims priority to U.S. Provisional Patent Application Ser. No. 63/262,049 filed on Oct. 4, 2021, the entire content of which is hereby incorporated herein by reference.

FIELD

Various embodiments of the disclosure relate to speech recognition and deep neural networks. More specifically, various embodiments of the disclosure relate to an electronic apparatus and method for visual speech recognition based on connectionist temporal classification loss.

BACKGROUND

Advancements in the field of neural networks have led to development of various techniques for speech recognition. For example, there are speech-to-text models that can process audio to generate captions. The captions may not always be flawless, especially if the audio is recorded in a noisy environment or if people in the video don't enunciate properly. To produce captions, another option includes analysis of lip movements of speakers in the video. However, most conventional techniques for lip reading don't perform well in detection of word boundaries and rely on audio portion of the video to extract word boundaries.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for visual speech recognition based on connectionist temporal classification loss is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
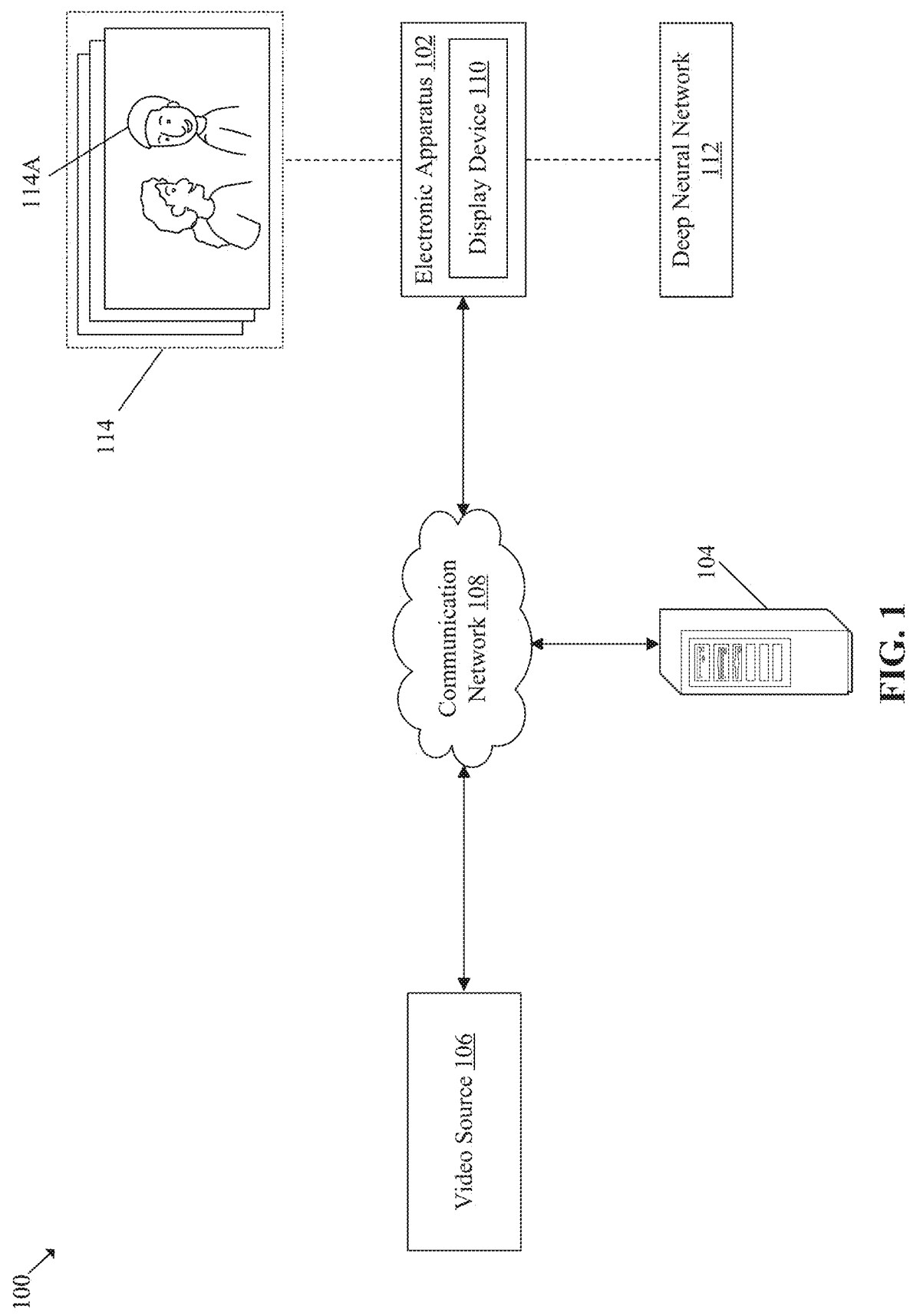
FIG. 1 is a block diagram that illustrates an exemplary network environment for visual speech recognition based on connectionist temporal classification loss, in accordance with an embodiment of the disclosure.

The following described implementation may be found in the disclosed electronic apparatus and method for visual speech recognition based on connectionist temporal classification (CTC) loss. Exemplary aspects of the disclosure provide an electronic apparatus, which may provide a method for visual speech recognition based on CTC loss. The electronic apparatus may be configured to receive a video that includes one or more human speakers and generate a prediction corresponding to lip movements of the one or more human speakers in the video. The prediction may be generated based on application of a Deep Neural Network (DNN) on the video (in a frame-by-frame manner). The loss functions which supervise the training of the DNN may be a combination of two separate functions, i.e., a connectionist temporal classification (CTC) loss function and a cross-entropy loss function. The prediction may be fed to the CTC loss function to find the best (or an optimal) path with a highest probability. The other loss function may be used to compare the prediction (e.g., a prediction matrix) with an actual alignment in the training phase. The two loss functions together may boost both accuracy and convergence speed of the DNN. In contrast to known CTC loss functions, the CTC function of the present disclosure may configure the DNN in the training phase to predict word boundaries corresponding to frames of the video in addition to character predictions.

For each image frame of the video, the prediction includes a set of probability values corresponding to a set of class labels (for example, characters that include at least one of one of a word character (i.e., a letter), a non-word character, a white-space, and a pseudo-character). This may allow the disclosed electronic apparatus to detect redundant (such as repeated) image frames of the video that may be undesired, or blank image frames that may be present between each word. Based on the prediction, the electronic apparatus may be configured to detect one or more word boundaries in a sequence of characters that correspond to the lip movements. Each of such word boundaries may be defined by a word-character at a first end of the sequence of characters and a non-word character or a character spacing at a second end of the sequence of characters. The prediction may allow the disclosed electronic apparatus to detect word boundary based on CTC loss and lip movement analysis, thereby eliminating use of audio information associated with the received video. Conventionally, the audio information is used as prior knowledge in the prediction of word boundaries as known lip-reading techniques do not perform well in the prediction of word boundaries. The disclosure eliminates the need to use the audio information in the prediction of the word boundaries.

The electronic apparatus may be configured to divide the video into a sequence of video clips, based on detection. Each video clip of the sequence of video clips may correspond to a word spoken by the one or more human speakers. The electronic apparatus may be further configured to generate a sequence of word predictions by processing the sequence of video clips. Thereafter, the electronic apparatus may be configured to generate a sentence, or a phrase based on the generated sequence of word predictions. The generation of the sentence or the phrase may include, for example, concatenation of the sequence of word predictions with a character spacing or a non-word character included in between adjacent word predictions of the sequence of word predictions.

FIG. 1 is a block diagram that illustrates an exemplary network environment for visual speech recognition based on connectionist temporal classification loss, in accordance with an embodiment of the disclosure. With reference to FIG. 1, there is shown a network environment 100. The network environment 100 may include an electronic apparatus 102, a server 104, and a video source 106. The electronic apparatus 102, the server 104, and the video source 106 may be communicatively coupled with each other, via a communication network 108. The electronic apparatus 102 may further include a display device 110. In the network environment 100, there is further shown a deep neural network (DNN) 112 associated with the electronic apparatus 102. There is further shown a video 114 that may include one or more human speakers 114A, as part of a plurality of image frames associated with a scene.

The electronic apparatus 102 may include suitable logic, circuitry, interfaces, and/or code that may be configured to receive the video 114 from the video source 106 and perform a visual speech recognition based on application of the DNN 112 on frames of the video 114. In an exemplary embodiment, the electronic apparatus 102 may be a display-enabled media player and the display device 110 may be included in the electronic apparatus 102. Examples of such an implementation of the electronic apparatus 102 may include, but are not limited to, a television (TV), an Internet-Protocol TV (IPTV), a smart TV, a smartphone, a personal computer, a laptop, a tablet, a wearable electronic device, or any other display device with a capability to receive, decode, and play content encapsulated in signals from cable or satellite networks, over-the-air broadcast, or Internet. In another exemplary embodiment, the electronic apparatus 102 may be a media player that may communicate with the display device 110, via a wired or a wireless connection. Examples of such an implementation of the electronic apparatus 102 may include, but are not limited to, a digital media player (DMP), a micro-console, a TV tuner, an Advanced Television Systems Committee (ATSC) 3.0 tuner, a set-top-box, an Over-the-Top (OTT) player, a digital media streamer, a media extender/regulator, a digital media hub, a computer workstation, a mainframe computer, a handheld computer, a smart appliance, a plug-in device, and/or any other computing device with content streaming functionality.

The server 104 may include suitable logic, circuitry, and interfaces, and/or code that may be configured to store the video 114 and may be used to train the DNN 112 using a CTC loss function and a cross-entropy loss function. In accordance with an embodiment, the server 104 may be implemented as a cloud server and may execute operations through web applications, cloud applications, HTTP requests, repository operations, file transfer, and the like. Other example implementations of the server 104 may include, but are not limited to, a database server, a file server, a content server, a web server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic apparatus 102 as two separate entities. In certain embodiments, the functionalities of the server 104 may be incorporated in its entirety or at least partially in the electronic apparatus 102, without a departure from the scope of the disclosure.

The video source 106 may include suitable logic, circuitry, and interfaces that may be configured to transmit the video 114 to the electronic apparatus 102. The video 114 on the video source 106 may include one or more human speakers 114A. In an embodiment, the video source 106 may be implemented as a storage device that stores the video 114. Examples of such an implementation of the video source 106 may include, but are not limited to, a Pen Drive, a Flash USB Stick, a Hard Disk Drive (HDD), a Solid-State Drive (SSD), and/or a Secure Digital (SD) card. In another embodiment, the video source 106 may be implemented as a media streaming server, which may transmit the media content to the electronic apparatus 102, via the communication network 108. In another embodiment, the video source 106 may be an TV tuner, such as an ATSC tuner, which may receive digital TV (DTV) signals from an over-the-air broadcast network and may extract the media content from the received DTV signal. Thereafter, the video source 106 may transmit the extracted video 114 to the electronic apparatus 102.

In FIG. 1, the video source 106 and the electronic apparatus 102 are shown as two separate devices. However, the present disclosure may not be so limiting and in some embodiments, the functionality of the video source 106 may be incorporated in its entirety or at least partially in the electronic apparatus 102, without departing from the scope of the present disclosure.

The display device 110 may include suitable logic, circuitry, and interfaces that may be configured to display the output produced by the electronic apparatus 102. For example, the display device 110 may be utilized to display the video 114 received from the electronic apparatus 102. The display device 110 may be further configured to display a caption that includes a sentence or phrase corresponding to lip movements of the human speaker(s) in the video 114. The display device 110 may be interfaced or connected with the electronic apparatus 102, through an I/O port (such as a High-Definition Multimedia Interface (HDMI) port) or a network interface. Alternatively, the display device 110 may be an embedded component of the electronic apparatus 102.

In at least one embodiment, the display device 110 may be a touch screen which may enable a user to provide a user-input via the display device 110. The display device 110 may be realized through several known technologies such as, but not limited to, at least one of a Liquid Crystal Display (LCD) display, a foldable or rollable display, a Light Emitting Diode (LED) display, a plasma display, or an Organic LED (OLED) display technology, or other display devices. In accordance with an embodiment, the display device 110 may refer to a display screen of a head mounted device (HMD), a smart-glass device, a see-through display, a projection-based display, an electro-chromic display, or a transparent display.

The DNN 112 may be referred to as a computational network or a system of nodes (for example, artificial neurons). For a deep learning implementation, the nodes of the deep learning model may be arranged in layers, as defined in a neural network topology. The layers may include an input layer, one or more hidden layers, and an output layer. Each layer may include one or more nodes (or artificial neurons, for example). Outputs of all nodes in the input layer may be coupled to at least one node of hidden layer(s). Similarly, inputs of each hidden layer may be coupled to outputs of at least one node in other layers of the model.

Outputs of each hidden layer may be coupled to inputs of at least one node in other layers of the deep learning model. One or more nodes in the final layer may receive inputs from at least one hidden layer to output a result. The number of layers and the number of nodes in each layer may be determined from the hyper-parameters, which may be set before or after training the DNN 112 on a training dataset.

Each node of the DNN 112 may correspond to a mathematical function (e.g., a sigmoid function or a rectified linear unit) with a set of parameters, tunable during training of the model. The set of parameters may include, for example, a weight parameter, a regularization parameter, and the like. Each node may use the mathematical function to compute an output based on one or more inputs from nodes in other layer(s) (e.g., previous layer(s)) of the deep learning model. All or some of the nodes of the deep learning model may correspond to same or a different mathematical function.

The DNN 112 may be trained on a task of lip movement analysis (or lip reading) using a video dataset as input to generate prediction(s) corresponding to lip movements of one or more human speakers in each sample video of the video dataset. In training, the DNN 112 may use a CTC loss function to generate predictions that indicate characters/words corresponding to lip movements and respective word boundaries between the characters. In general, CTC is a type of neural network output and associated scoring function, for training recurrent neural network (RNNs) for time series input. In present disclosure, the time series input may indicate human mouth motion (i.e., depicted in the video). The word boundaries may be predicted by the DNN 112 by processing frames of videos. The DNN 112 may be also trained based on a cross-entropy loss function. The trained DNN 112 may be used to compare the prediction with reference class labels that may include a ground truth alignment.

The two loss functions (i.e., the CTC loss function and the cross-entropy loss function) may mutually boost the convergence speed and accuracy in the training phase of the DNN 112. The detailed implementation of the cross-entropy loss function may be known to one skilled in the art, and therefore, a detailed description for the cross-entropy loss function has been omitted from the disclosure for the sake of brevity.

The DNN 112 may be defined by its hyper-parameters and topology/architecture. For example, the DNN 112 may have a number of nodes (or neurons), activation function(s), number of weights, a cost function, a regularization function, an input size, a learning rate, number of layers, and the like.

In training of the DNN 112, one or more parameters of each node may be updated based on whether an output of the final layer for a given input (from the training dataset) matches a correct result based on a loss function for the DNN 112. The above process may be repeated for same or a different input till a minima of loss function is achieved, and a training error is minimized. Several methods for training are known in the art, for example, gradient descent, stochastic gradient descent, batch gradient descent, gradient boost, meta-heuristics, and the like.

In an embodiment, the DNN 112 may include electronic data, which may be implemented as, for example, a software component of an application executable on the electronic apparatus 102. The DNN 112 may include code and routines that may be configured to enable a computing device, such as the electronic apparatus 102 to perform one or more operations for visual speech recognition based on the CTC loss function. Additionally, or alternatively, the DNN 112 may be implemented using hardware including, but not limited to, a processor, a microprocessor (e.g., to perform or control performance of one or more operations), a field-programmable gate array (FPGA), a co-processor (such as an AI-accelerator), or an application-specific integrated circuit (ASIC). In some embodiments, the trained DNN 112 may be implemented using a combination of both hardware and software.

In certain embodiments, the DNN 112 may be implemented based on a hybrid architecture of multiple Deep Neural Networks (DNNs). Examples of the DNN 112 may include a neural network model, such as, but are not limited to, an artificial neural network (ANN), a convolutional neural network (CNN), a recurrent neural network (RNN), a CNN-recurrent neural network (CNN-RNN), R-CNN, Fast R-CNN, Faster R-CNN, a You Only Look Once (YOLO) network, a Residual Neural Network (Res-Net), a Feature Pyramid Network (FPN), a Retina-Net, a Single Shot Detector (SSD), Natural Language processing and (OCR in some cases) typically use networks, such as CNN-recurrent neural network (CNN-RNN), a Long Short-Term Memory (LSTM) network based RNN, LSTM+ANN, hybrid lip-reading (HLR-Net) model, and/or a combination thereof.

The communication network 108 may include a communication medium through which the electronic apparatus 102, the server 104 and the video source 106 may communicate with each other. Examples of the communication network 108 may include, but are not limited to, the Internet, a cloud network, a Wireless Local Area Network (WLAN), a Wireless Fidelity (Wi-Fi) network, a Personal Area Network (PAN), a Local Area Network (LAN), a telephone line (POTS), and/or a Metropolitan Area Network (MAN), a mobile wireless network, such as a Long-Term Evolution (LTE) network (for example, 4th Generation or 5th Generation (5G) mobile network (i.e., 5G New Radio)). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the electronic apparatus 102 may receive an input, for example, to turn-on the electronic apparatus 102 or to activate a visual speech recognition mode. Based on the input, the electronic apparatus 102 may be configured to perform a set of operations to perform the visual speech recognition, as described herein.

At any time-instant, the electronic apparatus 102 may receive the video 114 from the video source 106. The video 114 may be any digital media, which can be rendered, streamed, broadcasted, and stored on any electronic device or storage. The video 114 may include one or more human speakers 114A. For example, the video 114 may be a movie clip that depicts a scene in which two or more actors may be having a conversation. Examples of the video 114 may include, but are not limited to, images (such as overlay graphics), animations (such as 2D/3D animations or motion graphics), audio/video data, conventional television programming (provided via traditional broadcast, cable, satellite, Internet, or other means), pay-per-view programs, on-demand programs (as in video-on-demand (VOD) systems), or Internet content (e.g., streaming media, downloadable media, Webcasts, etc.). In an embodiment, the received video 114 may be a pre-recorded video or a live video.

The electronic apparatus 102 may be configured to generate a prediction corresponding to lip movements of the one or more human speakers 114A in the video 114. The prediction may be generated based on application of the DNN 112 on the video 114. The DNN 112 may be a pre-trained network that used the CTC loss function in training phase. Details related to the generation of the prediction are provided, for example, in FIG. 3. In accordance with an embodiment, for each image frame of the video 114, the prediction may include a set of probability values corresponding to a set of class labels. The set of class labels may include characters that include at least one of one of a word character (i.e., a letter), a non-word character, a blank, a white-space, and a pseudo-character (as defined in CTC loss).

Based on the prediction, the electronic apparatus 102 may detect one or more word boundaries in a sequence of characters that correspond to the lip movements. Each of the detected one or more word boundaries may be defined by a word-character at a first end of the sequence of characters and a non-word character (e.g., a hyphen, a punctuation, and the like) or a character spacing at a second end of the sequence of characters. Details related to the detection of the one or more word boundaries are provided, for example, in FIG. 3.

The electronic apparatus 102 may be further configured to divide the video 114 into a sequence of video clips based on the detection. Each video clip of the sequence of video clips may correspond to a word spoken by the one or more human speakers 114A. After the division, the electronic apparatus 102 may be configured to generate a sequence of word predictions by processing the sequence of video clips, as described, for example, in FIG. 3. Based on the sequence of word predictions, the electronic apparatus 102 may generate a sentence or a phrase. The generation of the sentence or the phrase may include a concatenation of the sequence of word predictions with a character spacing or a non-word character included in between adjacent word predictions of the sequence of word predictions. The generation of the sentence or the phrase is described, for example, in FIG. 3.

Figure 2:
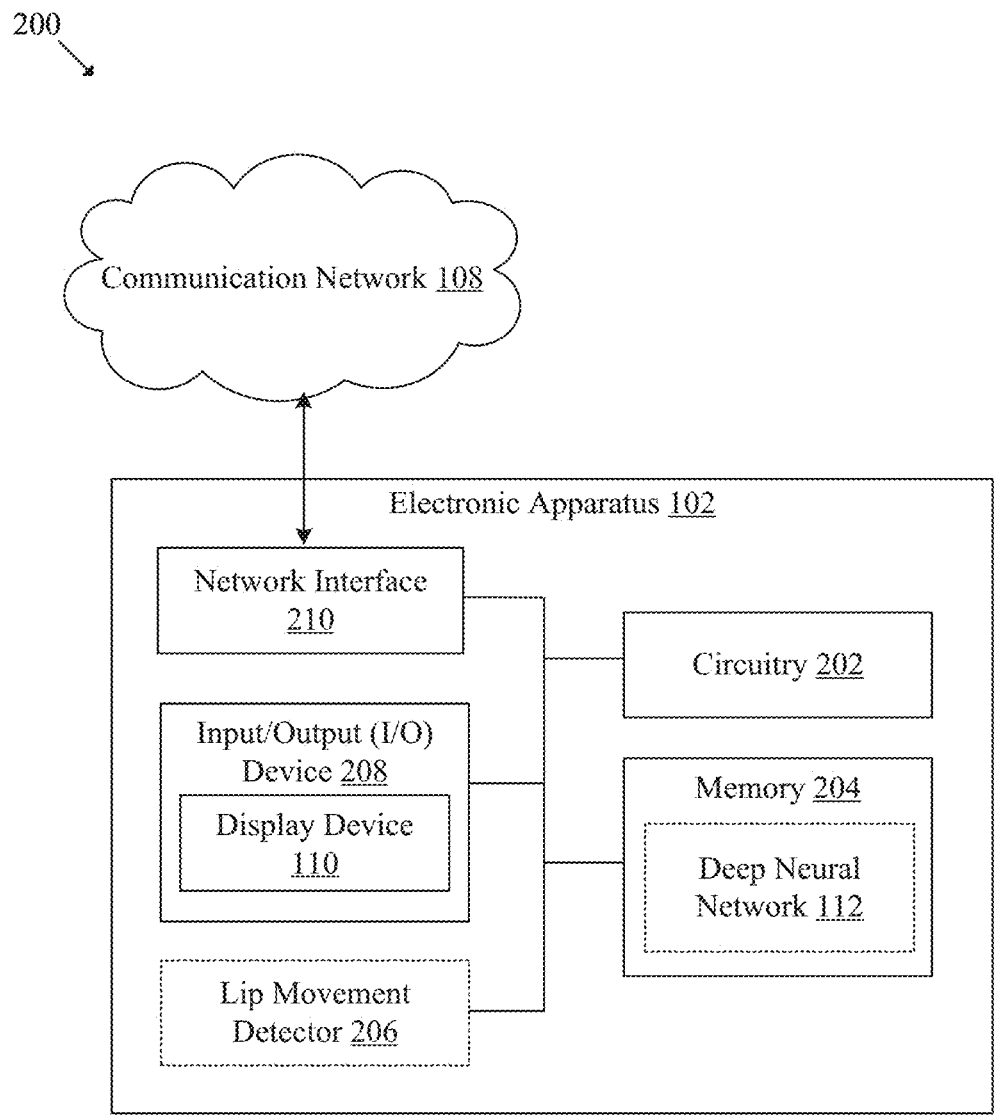
FIG. 2 is a block diagram that illustrates an exemplary electronic apparatus for visual speech recognition, in accordance with an embodiment of the disclosure.

FIG. 2 is a block diagram that illustrates an exemplary electronic apparatus for visual speech recognition, in accordance with an embodiment of the disclosure. FIG. 2 is explained in conjunction with elements from FIG. 1. With reference to FIG. 2, there is shown the electronic apparatus 102. The electronic apparatus 102 may include circuitry 202, a memory 204, a lip movement detector 206, an input/output (I/O) device 208, and a network interface 210. The I/O device 208 may include the display device 110. The memory 204 may include the DNN 112. The network interface 210 may connect the electronic apparatus 102 with the server 104 and the video source 106, via the communication network 108.

The circuitry 202 may include suitable logic, circuitry, and/or interfaces that may be configured to execute program instructions associated with different operations to be executed by the electronic apparatus 102. The circuitry 202 may include one or more processing units, which may be implemented as an integrated processor or a cluster of processors that perform the functions of the one or more processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store the DNN 112 and the video 114. The memory 204 may be further configured to store a set of class labels. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The lip movement detector 206 may include suitable logic, circuitry, interfaces and/or code that may be configured to detect lip movements in the video 114. In accordance with an embodiment, the lip movement detector 206 may be configured to generate a prediction corresponding to the detected lip movements of the one or more human speakers 114A in the video 114. The lip movement detector 206 may be implemented as an AI model or in an image recognition tool. The lip movement detector 206 may be further implemented based on several processor technologies known in the art. Examples of the processor technologies may include, but are not limited to, a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The I/O device 208 may include suitable logic, circuitry, interfaces, and/or code that may be configured to receive an input and provide an output based on the received input. The I/O device 208 may include various input and output devices, which may be configured to communicate with the circuitry 202. In an example, the electronic apparatus 102 may display (via the display device 110 associated with the I/O device 208) the generated sentence, or phrase. Examples of the I/O device 208 may include, but are not limited to, a touch screen, a keyboard, a mouse, a joystick, a display device (for example, the display device 110), a microphone, or a speaker.

The network interface 210 may include suitable logic, circuitry, interfaces, and/or code that may be configured to facilitate communication between the electronic apparatus 102, the server 104, and the video source 106, via the communication network 108. The network interface 210 may be implemented by use of various known technologies to support wired or wireless communication of the electronic apparatus 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 210 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). Various operations of the circuitry 202 for visual speech recognition based on connectionist temporal classification loss are described further, for example, in FIGS. 3 and 4.

Figure 3:
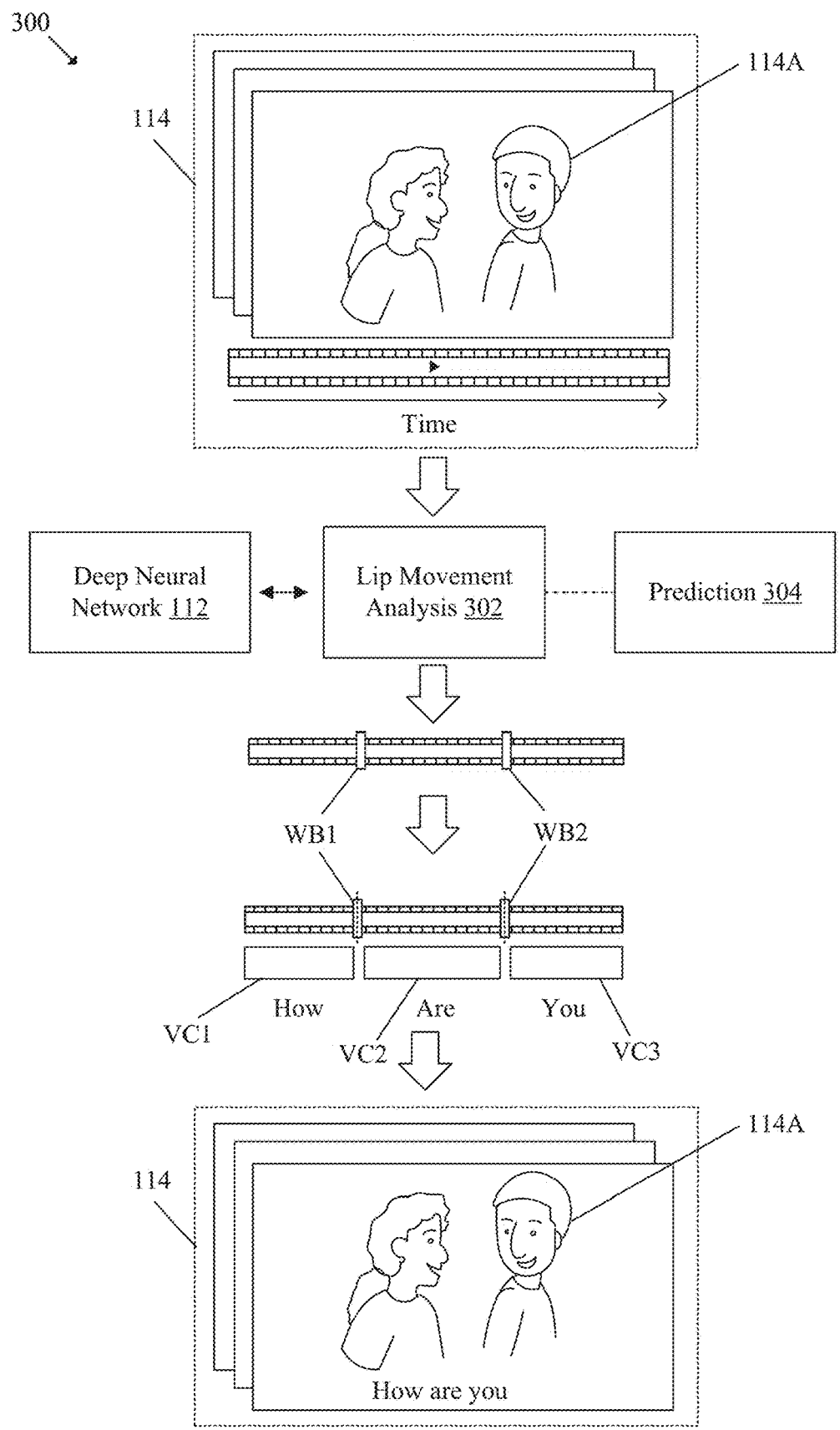
FIG. 3 is a diagram that illustrates an exemplary processing pipeline for visual speech recognition, in accordance with an embodiment of the disclosure.

FIG. 3 is a diagram that illustrates an exemplary processing pipeline for visual speech recognition, in accordance with an embodiment of the disclosure. FIG. 3 is explained in conjunction with elements from FIG. 1 and FIG. 2. With reference to FIG. 3, there is shown an exemplary processing pipeline 300 that illustrates exemplary operations for visual speech recognition. The exemplary operations may be executed by any computing system, for example, by the electronic apparatus 102 of FIG. 1 or by the circuitry 202 of FIG. 2.

In an operational state, the circuitry 202 may be configured to receive the video 114 from the video source 106. The video 114 may include the one or more human speakers 114A, as part of a plurality of image frames corresponding to a scene. For example, the video 114 may correspond to a television program, in which the one or more human speakers 114A may speak while performing in the scene.

In an embodiment, the circuitry 202 may be configured to extract image frames of the video 114. Each image frame of the video 114 may be associated with a frame number. The frame number may be any numerical value (such as 1, 2, 3, 4, or any other numeric value) between 1 and a total number of image frames of the video 114. For example, if the video 114 is a high-definition (HD) video, then a size of each corresponding image frame may be 1280×720 pixels. In an embodiment, the video 114 may be divided into T\*H\*W\*3 video frames, where T may be indicative of a frame number associated with frames of the video 114, H may be indicative of a height (i.e., 720) of the frame, W may be indicative of a width (i.e., 1280) of the frame, and 3 may be indicative of number of color channels per frame of the video 114. For example, if the video 114 is a full HD video, then a size of each frame of the video, may be 1920×1080 pixels, which may be represented as 1\*1080\*1920\*3 video frame.

At 302, lip movements analysis may be performed. The circuitry 202 may be configured to generate a prediction 304 corresponding to lip movements of the one or more human speakers 114A in the video 114. The prediction 304 may be generated based on application of the DNN 112 on the video 114. In accordance with an embodiment, the prediction 304 may include a T×N matrix corresponding to frames of the video 114, where T may be indicative of frame numbers associated with the video 114, and N may be indicative of all possible class labels. For example, if two words are to be detected (such as "Hello" and "World", then the prediction 304 may correspond to T×(10+1) or T×11 matrix, where 10 may indicate the numbers of letter classes (5 for Hello and 5 for world) and 1 may indicate a blank class for the character space between Hello and World. Here, the number of classes (11) should be equal to the number of letters (10) and the blank class (1).

In accordance with an embodiment, the DNN 112 may receive a sequence of frames (included in the video 114) as an input and may detect one or more human speakers 114A in each frame of the sequence of frames. Further, the DNN 112 may track a position of lips of the detected one or more human speakers 114A in each frame. Based on the position, the DNN 112 may extract lip movement information from each frame of the sequence of image. In an embodiment, the video 114 may be analyzed using one or more image processing techniques to detect the lip movements and to extract the lip movement information.

The DNN 112 may process the lip movement information to generate the prediction 304. For each frame of the video 114, the prediction 304 may include a set of probability values corresponding to the set of class labels. For each class label, the probability value may specify a confidence (in terms of a probability value between 0 and 1) of the DNN 112 in prediction of a class label for a given pattern of lip movement. A higher probability value may denote a higher likelihood or confidence. The set of class labels may include soft labels or hard labels to represent classes. The prediction 304 corresponding to the lip movements may belong to one of such classes. By way of example, and not limitation, the set of class labels may include characters or a blank. The characters may include at least one of one of a word character (i.e., a letter), a non-word character, a white-space, and/or a pseudo-character. Examples of the non-word character may include, but not limited to, a hyphen, a punctuation, a set of special characters such as "*", "&" and a set of non-English alphabets such as "β" and "π".

In an example scenario, if the prediction 304 includes a set of probability values corresponding to a set of class labels (Class A, Class B, Class C, and Blank), then the prediction 304 (in the form of a matrix) is shown in following Table 1:

TABLE 1

| | Prediction | | | |
|---|---|---|---|---|
| Frame Number (T) | Class A | Class B | Class C | Blank |
| 1 | 0.7 | 0.0 | 0.01 | 0.03 |
| ... | ... | ... | ... | ... |
| 10 | 0.8 | 0.02 | 0.17 | 0.01 |
| 11 | 0.04 | 0.05 | 0.01 | 0.9 |
| 12 | 0.02 | 0.01 | 0.07 | 0.9 |
| 13 | 0.06 | 0.8 | 0.11 | 0.03 |
| ... | ... | ... | ... | ... |
| 25 | 0.03 | 0.94 | 0.02 | 0.01 |
| 26 | 0.05 | 0.01 | 0.12 | 0.82 |
| 27 | 0.0 | 0.01 | 0.86 | 0.13 |
| ... | ... | ... | ... | ... |
| 40 | 0.0 | 0.11 | 0.88 | 0.01 |
| ... | ... | ... | ... | ... |

For frames (11-12 and 26) of the video, the prediction 304 may favor the Blank class with a probability above 0.8. The Blank class may indicate the word boundary in the prediction 304.

The circuitry 202 may be configured to detect, based on the prediction, one or more word boundaries in a sequence of characters that correspond to the lip movements. The one or more word boundaries may include a start and an end point of each word associated with dialogues between the one or more human speakers 114A and/or other words enunciated or spoken by the one or more human speakers 114A in the video 114.

In an embodiment, each of the detected one or more word boundaries may be defined by a word-character at a first end of the sequence of characters and a non-word character or a character spacing at a second end of the sequence of characters. For example, if the sequence of characters corresponding to the lip movements is "how are you", then the circuitry 202 may be configured to detect two word boundaries to mark start and end of each predicted word. In FIG. 3, the word boundaries (such as word boundaries WB1 and WB2) are shown as example and such boundaries may correspond to frames of the video 114 that may be classified as blank frames in the prediction 304.

The circuitry 202 may be configured to divide the video 114 into a sequence of video clips based on the detection. Each video clip of the sequence of video clips may correspond to a word spoken by the one or more human speakers 114A. For example, the sentence or phrase spoken by the one or more human speakers 114A may be "how are you". The circuitry 202 may be configured to divide the video 114 into three video clips such as, shown in FIG. 3, VC1, VC2, and VC3. The video clips VC1, VC2, and VC3 may correspond to spoken words such as "how", "are", and "you".

The circuitry 202 may be further configured to generate a sequence of word predictions by processing the sequence of video clips. Each word prediction of the sequence of word predictions may be generated based on application of the DNN 112 on a corresponding video clip of the sequence of video clips. Thereafter, based on the generated sequence of word predictions, the circuitry 202 may be configured to generate a sentence or a phrase. The generation of the sentence or the phrase may include a concatenation of the sequence of word predictions with a character spacing or a non-word character included in between adjacent word predictions of the sequence of word predictions. For example, in FIG. 3, a sequence of word predictions "how", "are", "you" are shown. The circuitry 202 may be configured to concatenate the sequence of word predictions to generate a phrase "how are you". Punctuations or other formatting rules may be applied to the sentence or phrase based on facial expression of the one or more human speakers 114A and/or semantic rules associated with a language in which the sentence or phrase is generated. For example, "how are you" may be updated to "How are you?".

Figure 4:
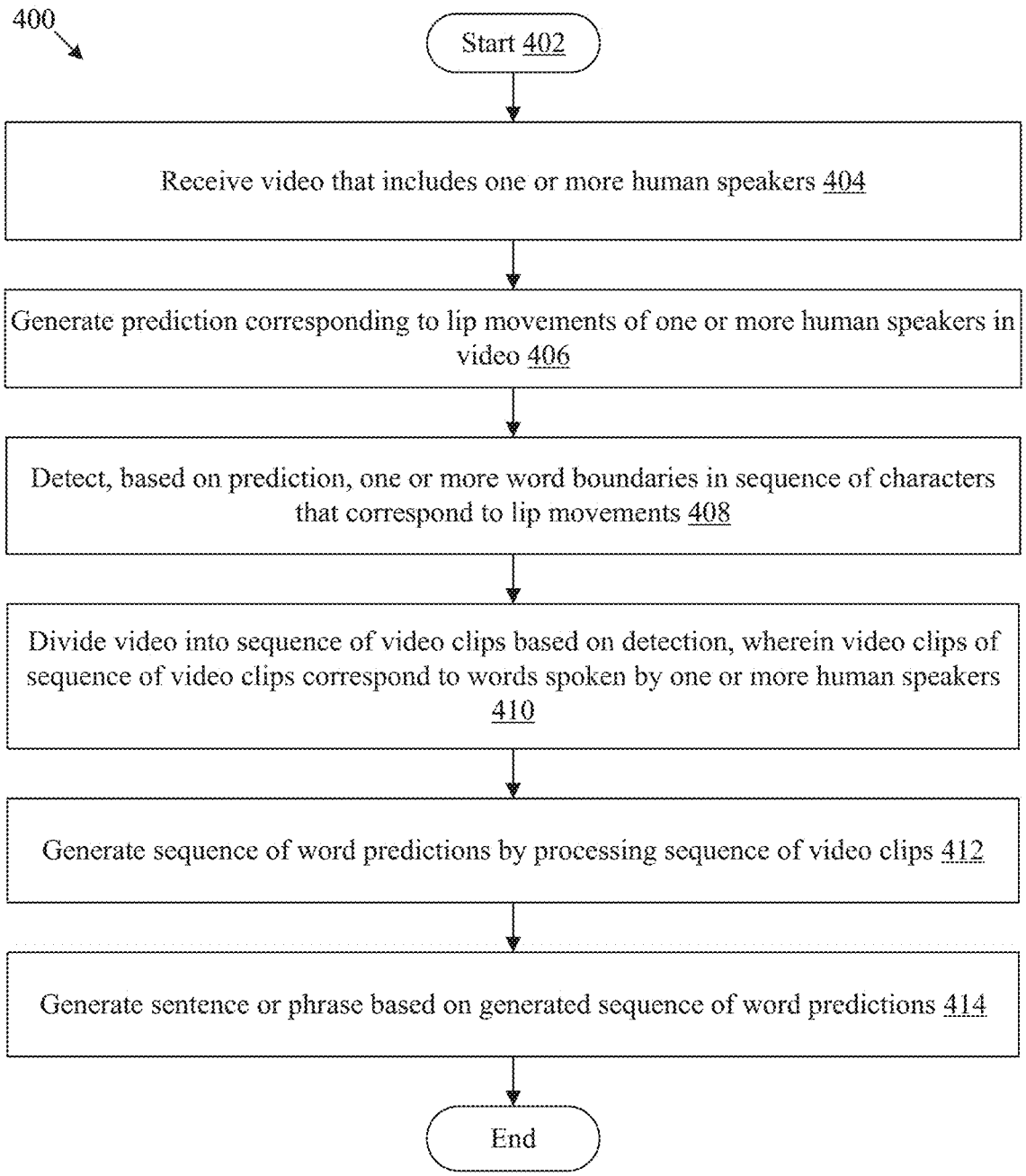
FIG. 4 is a flowchart that illustrates exemplary operations for visual speech recognition based on connectionist temporal classification loss, in accordance with an embodiment of the disclosure.

FIG. 4 is a flowchart that illustrates exemplary operations for visual speech recognition based on connectionist temporal classification loss, in accordance with an embodiment of the disclosure. FIG. 4 is described in conjunction with elements from FIGS. 1, 2, and 3. With reference to FIG. 4, there is shown a flowchart 400. The flowchart 400 may include operations from 402 to 414 and may be implemented by the electronic apparatus 102 of FIG. 1 or by the circuitry 202 of FIG. 2. The flowchart 400 may start at 402 and proceed to 404.

At 404, a video that includes one or more human speakers may be received. In an embodiment, the circuitry 202 may be configured to receive the video 114 that includes one or more human speakers 114A, as described, for example, in FIG. 3.

At 406, a prediction corresponding to lip movements of the one or more human speakers in the video may be generated. In an embodiment, the circuitry 202 may be configured to generate the prediction 304 corresponding to lip movements of the one or more human speakers 114A in the video 114. The prediction 304 may be generated based on application of the DNN 112 on the video 114, and the DNN 112 may be trained using CTC loss function. In an example, for each image frame of the video 114, the prediction 304 may include a set of probability values corresponding to a set of class labels. The set of class labels may include, but not limited to words or characters that include at least one of one of a word character, a non-word character, a white-space, and a pseudo-character. The generation of the prediction 304 is described, for example, in FIG. 3.

At 408, one or more word boundaries in a sequence of characters that correspond to the lip movements may be detected. In an embodiment, the circuitry 202 may be configured to detect, based on the prediction 304, the one or more word boundaries in the sequence of characters that correspond to the lip movements. For example, each of the detected one or more word boundaries may be defined by a word-character at a first end of the sequence of characters and a non-word character or a character spacing at a second end of the sequence of characters. The detection of the one or more word boundaries is described, for example, in FIG. 3.

At 410, the video may be divided into a sequence of video clips and video clips of the sequence of video clips correspond to words spoken by one or more human speakers. In an embodiment, the circuitry 202 may be configured to divide the video 114 into a sequence of video clips based on the detection. The division of the video is described, for example, in FIG. 3.

At 412, a sequence of word predictions may be generated by processing the sequence of video clips. In an embodiment, the circuitry 202 may be configured to generate the sequence of word predictions by processing the sequence of video clips. The generation of the sequence of word prediction is described, for example, in FIG. 3.

At 414, a sentence or a phrase may be generated based on the generated sequence of words predictions. In an embodiment, the circuitry may be configured to generate the sentence, or a phrase based on the generated sequence of word predictions. The generation of the sentence or the phrase may include, but not limited to a concatenation of the sequence of word predictions with a character spacing or a non-word character included in between adjacent word predictions of the sequence of word predictions. The generation of the sentence or the phrase is described, for example, in FIG. 3. Control may pass to end.

Although the flowchart 400 is illustrated as discrete operations, such as 404, 406, 408, 410, 412, and 414, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic apparatus (for example, the electronic apparatus 102). The instructions may cause the electronic apparatus 102 to perform operations that include retrieval of a video 114 that comprises one or more human speakers 114A. The operations may further include generation of prediction 304 corresponding to lip movements of the one or more human speakers 114A in the video 114. The prediction 304 may be generated based on application of the DNN 112 on the video 114, and the DNN 112 may be trained using a connectionist temporal classification (CTC) loss function. The operations may further include detection of, based on the prediction 304, one or more word boundaries in a sequence of characters that correspond to the lip movements. The operations may further include division the video into a sequence of video clips based on the detection. Each video clip of the sequence of video clips corresponds to a word spoken by the one or more human speakers 114A. The operations may further include generation of a sequence of word predictions by processing the sequence of video clips. The operations may further include generation of a sentence, or a phrase based on the generated sequence of word predictions.

Exemplary aspects of the disclosure may provide an electronic apparatus (such as, the electronic apparatus 102 of FIG. 1) that includes circuitry (such as, the circuitry 202). The circuitry 202 may be configured to receive a video 114 that comprises one or more human speakers 114A. The circuitry 202 may be configured to generate a prediction 304 corresponding to lip movements of the one or more human speakers 114A in the video 114. The prediction 304 may be generated based on application of the DNN 112 on the video 114, and the DNN 112 may be trained using a connectionist temporal classification (CTC) loss function. The circuitry 202 may be configured to detect, based on the prediction 304, one or more word boundaries in a sequence of characters that correspond to the lip movements. The circuitry 202 may be configured to divide the video into a sequence of video clips based on the detection. Each video clip of the sequence of video clips corresponds to a word spoken by the one or more human speakers 114A. The circuitry 202 may be configured to generate a sequence of word predictions by processing the sequence of video clips. The circuitry 202 may be configured to generate a sentence or a phrase based on the generated sequence of word predictions.

In an embodiment, each of the detected one or more word boundaries may be defined by a word-character at a first end of the sequence of characters and a non-word character or a character spacing at a second end of the sequence of characters.

In an embodiment, for each image frame of the video, the prediction 304 includes a set of probability values corresponding to a set of class labels.

In an embodiment, the set of class labels includes words or characters that include at least one of one of a word character, a non-word character, a white-space, and a pseudo-character.

In an embodiment, the DNN 112 may be trained further based on a cross-entropy loss function.

In an embodiment, each word prediction of the sequence of word predictions may be generated based on application of the DNN 112 on a corresponding video clip of the sequence of video clips.

In an embodiment, the generation of the sentence or the phrase includes a concatenation of the sequence of word predictions with a character spacing or a non-word character included in between adjacent word predictions of the sequence of word predictions.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic apparatus, comprising:
   circuitry configured to:
   receive a video that comprises at least one human speaker;
   extract a plurality of frames from the video;
   generate a prediction corresponding to lip movements of the at least one human speaker in the plurality of frames, wherein
      the prediction includes probability values corresponding to a set of class labels for each frame of the plurality of frames,
      the set of class labels corresponds to a plurality of word characters and at least one blank space,
      the each frame of the plurality of frames corresponds to at least one word character of the plurality of word characters or the at least one blank space,
      the prediction is generated without audio information,
      the prediction is generated based on a first application of a Deep Neural Network (DNN) on the video, and
      the DNN is trained using a connectionist temporal classification (CTC) loss function;
   detect, based on the prediction of the at least one blank space, at least one word boundary in a sequence of characters that correspond to the lip movements;
   divide the video into a sequence of video clips based on the detected at least one word boundary, wherein
      each video clip of the sequence of video clips is without the audio information, and
      the each video clip of the sequence of video clips corresponds to a word spoken by the at least one human speaker;
   generate a sequence of word predictions based on the sequence of video clips, wherein each word prediction of the sequence of word predictions is generated based on a second application of the DNN on a corresponding video clip of the sequence of video clips; and
   generate one of a sentence or a phrase based on the generated sequence of word predictions.

2. The electronic apparatus according to claim 1, wherein each of the detected at least one word boundary is defined by the at least one word character at a first end of the sequence of characters and one of a non-word character or the at least one blank space at a second end of the sequence of characters.

3. The electronic apparatus according to claim 1, wherein the set of class labels further includes at least one of a non-word character, a white-space, or a pseudo-character.

4. The electronic apparatus according to claim 1, wherein the DNN is trained further based on a cross-entropy loss function.

5. The electronic apparatus according to claim 1, wherein the generation of the one of the sentence or the phrase includes a concatenation of the sequence of word predictions with one of a character spacing or a non-word character in between adjacent word predictions of the sequence of word predictions.

6. The electronic apparatus according to claim 1, wherein the circuitry is further configured to add a punctuation to the one of the sentence or the phrase based on a facial expression of the at least one human speaker.

7. A method, comprising:
in an electronic apparatus:
receiving a video that comprises at least one human speaker;
extracting a plurality of frames from the video;
generating a prediction corresponding to lip movements of the at least one human speaker in the plurality of frames, wherein
the prediction includes probability values corresponding to a set of class labels for each frame of the plurality of frames,
the set of class labels corresponds to a plurality of word characters and at least one blank space,
the each frame of the plurality of frames corresponds to at least one word character of the plurality of word characters or the at least one blank space,
the prediction is generated without audio information,
the prediction is generated based on a first application of a Deep Neural Network (DNN) on the video, and
the DNN is trained using a connectionist temporal classification (CTC) loss function;
detecting, based on the prediction of the at least one blank space, at least one word boundary in a sequence of characters that correspond to the lip movements;
dividing the video into a sequence of video clips based on the detected at least one word boundary, wherein
each video clip of the sequence of video clips is without the audio information, and
the each video clip of the sequence of video clips corresponds to a word spoken by the at least one human speaker;
generating a sequence of word predictions by processing the sequence of video clips, wherein each word prediction of the sequence of word predictions is generated based on a second application of the DNN on a corresponding video clip of the sequence of video clips; and
generating one of a sentence or a phrase based on the generated sequence of word predictions.

8. The method according to claim 7, wherein each of the detected at least one word boundary is defined by the at least one word character at a first end of the sequence of characters and one of a non-word character or the at least one blank space at a second end of the sequence of characters.

9. The method according to claim 7, wherein the set of class labels further includes at least one of a non-word character, a white-space, or a pseudo-character.

10. The method according to claim 7, wherein the DNN is trained further based on a cross-entropy loss function.

11. The method according to claim 7, wherein the generation of the one of the sentence or the phrase includes a concatenation of the sequence of word predictions with one of a character spacing or a non-word character in between adjacent word predictions of the sequence of word predictions.

12. A non-transitory computer-readable medium having stored thereon, computer-executable instructions that when executed by an electronic apparatus, causes the electronic apparatus to execute operations, the operations comprising:
receiving a video that comprises at least one human speaker;
extracting a plurality of frames from the video;
generating a prediction corresponding to lip movements of the at least one human speaker in the plurality of frames, wherein
the prediction includes probability values corresponding to a set of class labels for each frame of the plurality of frames,
the set of class labels corresponds to a plurality of word characters and at least one blank space,
the each frame of the plurality of frames corresponds to at least one word character of the plurality of word characters or the at least one blank space,
the prediction is generated without audio information,
the prediction is generated based on a first application of a Deep Neural Network (DNN) on the video, and
the DNN is trained using a connectionist temporal classification (CTC) loss function;
detecting, based on the prediction of the at least one blank space, at least one word boundary in a sequence of characters that correspond to the lip movements;
dividing the video into a sequence of video clips based on the detected at least one word boundary, wherein
each video clip of the sequence of video clips is without the audio information, and
the each video clip of the sequence of video clips corresponds to a word spoken by the at least one human speaker;
generating a sequence of word predictions by processing the sequence of video clips, wherein each word prediction of the sequence of word predictions is generated based on a second application of the DNN on a corresponding video clip of the sequence of video clips; and
generating one of a sentence or a phrase based on the generated sequence of word predictions.

13. The non-transitory computer-readable medium according to claim 12, wherein each of the detected at least one word boundary is defined by the at least one word character at a first end of the sequence of characters and one of a non-word character or the at least one blank space at a second end of the sequence of characters.

14. The non-transitory computer-readable medium according to claim 12, wherein the set of class labels further includes at least one of a non-word character, a white-space, or a pseudo-character.

15. The non-transitory computer-readable medium according to claim 12, wherein the DNN is trained further based on a cross-entropy loss function.

16. The non-transitory computer-readable medium according to claim 12, wherein the generation of the one of the sentence or the phrase includes a concatenation of the sequence of word predictions with one of a character spacing or a non-word character in between adjacent word predictions of the sequence of word predictions.

* * * * *